United States Patent Office 2,912,088
Patented Nov. 10, 1959

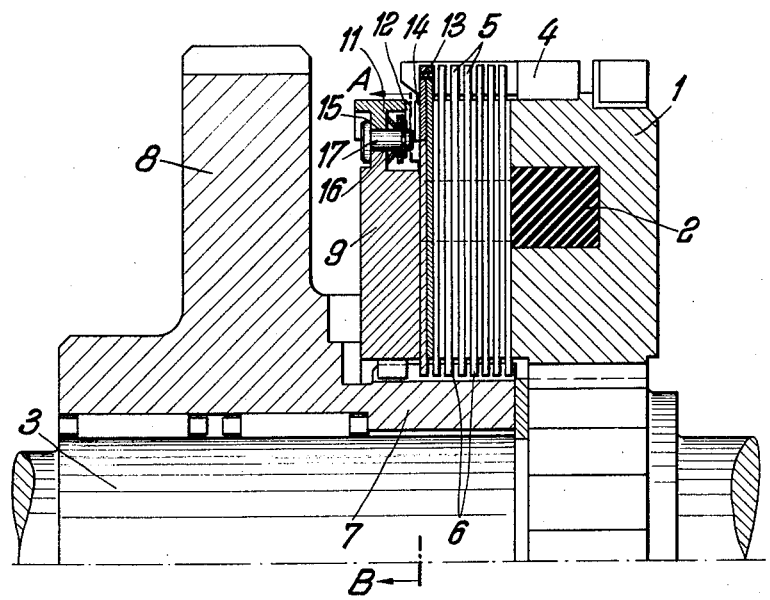
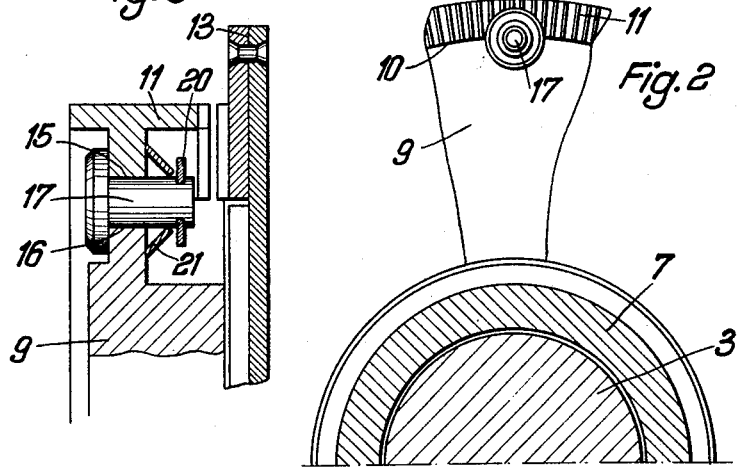

2,912,088

COMPOUNDED CLAW AND DISC TYPE ELECTROMAGNETIC CLUTCH

Siegfried Breyer, Friedrichshafen, Germany, assignor to I-T-E Circuit Breaker Company, Philadelphia, Pa., a corporation of Pennsylvania Application February 4, 1957, Serial No. 638,134

Claims priority, application Germany February 3, 1956

2 Claims. (Cl. 192—53)

My invention relates to an electromagnetic clutch which is a combination of the disc type clutch and a form-locked clutch.

Disc type electromagnetic clutches are well known in the art as typified by United States Patent No. 2,254,625 to Ryba and in general are comprised of alternate laminations which are connected to an input drive means and an output drive means, respectively. These laminations are normally spaced from one another so that rotation of the laminations connected to the input member do not drive the output member since the laminations attached to the output member are disconnected from the input laminations.

When, however, a magnetic field is created, the alternate laminations are compacted together and serve as a friction couple to connect the input and output members. Since, however, this is a mere friction coupling, slipping will occur when the output load exceeds a predetermined value so that the net torque capacity of any clutch is limited. However, although the torque capacity of the clutch is limited there is exhibited the highly desirable feature of allowing a smooth transition from zero torque to some predetermined torque in coupling the input and output members.

The so-called formed-locked clutch is of a type wherein a direct physical inner connection or inner linking occurs between the input and output members. When this type of clutch is in its engaged position there is a substantially solid connection between the input and output members so that the torque capacity of the clutch is limited only by the strength of the clutch material. The disadvantage of this type of device lies in the fact that there is no smooth transition from zero torque to an operating torque, but rather there is an immediate and, in some cases, a violent connection between the input and output members.

The principle of my invention is to provide a novel combined disc and form-locked clutch which exhibits the best properties of each and eliminates the disadvantages of each. More specifically, I provide a clutch wherein magnetically energizable discs may be initially compacted together so that the clutch will initially operate as a disc type clutch and to thereafter cause a rigid mechanical inner engagement to occur between the driving and driven members as in the form-locked clutch device. Thus, in going from zero torque to some predetermined torque my novel clutch exhibits the desired properties of a disc type clutch. After picking up a predetermined load torque, the clutch is automatically converted to a form-locked type of clutch whereby the torque capacity of the clutch is limited only by the physical coupling between the input and output members.

Accordingly the primary object of my invention is to provide a novel combined disc type and form-locked type clutch.

Another object of my invention is to provide a novel clutch having disc members energizable by a magnetic field and having cooperating form-locking members which are subsequently operated into engagement by the same magnetic field.

A still further object of my invention is to provide a novel clutch device wherein disc members are utilized to initially transfer torque from a driving member to a driven member and to thereafter engage form-locking members for increasing the torque capacity of the clutch which is beyond the torque capacity of the disc members alone.

These and other objects of the present invention will become more apparent when taken in connection with the following description and the figures in which:

Figure 1 illustrates a central vertical section of a clutch constructed in accordance with the novel invention.

Figure 2 is a cross-sectional view of the clutch of Figure 1 when taken across the lines A—B of Figure 1.

Figure 3 shows a partial sectional view of a spring loaded claw ring of Figure 1 which operates as a form-locked clutch.

Referring to Figure 1, the clutch shown therein comprises a magnetic body 1 and a coil 2 therein, the magnetic body 1 being force fitted on an input shaft 3. A keying member 4 is solidly connected to the magnetic body 1 and engages cooperating slots in the outer discs 5 in the manner well known in the art. Inner laminations or discs 6 which cooperate with the outer discs 5 are keyed upon the wedge hub 7 of a driven member such as the gear 8. It is to be noted that both the outer laminations or discs 5 and the inner discs 6 are so keyed to their respective members that they are rotatable with their respective members but are axially movable with respect thereto.

An armature disc 9 is then seen as being further connected to the gear member 7 in the same manner as are the inner laminations 6. In operation of the disc clutch per se energization of energizing coil 2 will create a magnetic field which will pass through the upper portion of the discs 5 and 6, to the armature 9, through the bottom portion of discs 5 and 6, and back to the magnetic body 1. It is to be understood that the discs 5 and 6 are so constructed as to provide a magnetically solid path at their central radial portion so that they will not short circuit the magnetic path. This type of construction is shown in United States Patent No. 2,254,625 to Ryba.

Thus, for the first portion of the operating cycle of the clutch, the clutch of Figure 1 operates as a magnetic disc clutch.

As best seen in Figure 2, the armature disc 9 of Figure 1 has clutch ring 11 about its periphery 10, this clutch ring 11 bearing on a crown 12 of front claws. The last outer lamination 13 is, as seen in Figures 1 and 3, solidly connected with a counter-claw ring 14 which is positioned to cooperate with ring 11. The armature disc 9 as well as the clutch ring 11 have a plurality of semi-cylindrical holes 15 and 16 through which coupling pins 17 pass to couple these parts together. The coupling pins 17 then carry an elastic ring 20 at their outer end as seen in Figure 3 and a spring such as spring 21 is inserted between members 9, 11 and 20.

Although Figures 1, 2 and 3 only show one such coupling pin construction, it is understood that similar coupling mechanisms may be circumferentially distributed around the armature disc 9.

Clearly, the structure described hereinabove serves as the form-locked portion of the clutch, its operation being as follows:

When armature disc 9 is attracted to compress the discs 5 and 6 together, the clutch ring 11 and clutch ring 14 move toward the magnetic body 1 in such a manner that at first the air gap between the claw crowns 12 and 14 remains unchanged. When, however, the air gap between the adjacent discs decreases and the flux density of the magnetic field increases, a value is reached wherein the springs 21 are overcome and the clutch ring 11 is moved so that claw crowns 12 and 14 engage one another. At the same time hub 7 of gear 8 has been accelerated due to the engagement of adjacent discs 5 and 6 so that the speed of rotation of claw crown 12 and claw crown 14 are synchronized with one another so that they may mesh without grinding. Furthermore, by synchronizing the angular velocity of claw crowns 12 and 14 there will be substantially no impulse transmitted to the driven member when the claws engage. Thus in my novel clutch which is the combination of a magnetic disc clutch and a claw coupled clutch there will be a considerable increase in the transferable torque of the clutch as compared to a multiple disc clutch of the same size.

Furthermore, the construction of the clutch is such that only a few component parts are required. Another advantage of my novel clutch is that a conventional disc type clutch may be easily converted to a combined disc and form-locked clutch by simply removing the conventional type of armature disc and the outer end laminations and replacing these members by my novel armature disc 9 and outer end lamination 13 with their respective form-locked mechanisms.

Although I have here described preferred embodiments of my novel invention, many variations and modifications will now be evident to those skilled in the art and I prefer therefore to be limited not by the specific disclosure herein, but only by the appended claims.

I claim:

1. A combined disc clutch and magnetic clutch comprising a plurality of magnetic disc members, an armature member and a first and second cooperating form lock means; a first rotatable member and a second rotatable member; alternating discs of said plurality of magnetic disc members being connected to said first rotatable member and said second rotatable member respectively to rotate with their said respective rotatable members; said plurality of magnetic disc members being axially movable with respect to said first and second rotatable members; said armature member being positioned adjacent one of said magnetic disc members and being connected to one of said rotatable members; said last mentioned disc member being connected to the other of said rotatable members; means energizable for creating a magnetic field positioned to compact all of said plurality of said discs and said armature; said first and second cooperating form lock means being carried by said armature member and said one of said disc members adjacent thereto, said first and second cooperating form lock means engaging one another when said magnetic discs and said armature are compressed to a predetermined point to rigidly connect said first and second rotatable members; one of said first and second cooperating form lock means carrying spring biasing means for normally maintaining said cooperating form lock means out of engagement with one another until said discs are compressed to said predetermined point.

2. A combined disc clutch and magnetic clutch comprising a plurality of magnetic disc members, an armature member and a first and second cooperating form lock means; a first rotatable member and a second rotatable member; alternating discs of said plurality of magnetic disc members being connected to said first rotatable member and said second rotatable member respectively to rotate with their said respective rotatable members; said plurality of magnetic disc members being axially movable with respect to said first and second rotatable members; said armature member being positioned adjacent one of said magnetic disc members and being connected to one of said rotatable members; said last mentioned disc member being connected to the other of said members; means energizable for creating a magnetic field positioned to compact all of said plurality of said discs and said armature; said first and second cooperating form lock means being carried by said armature member and said one of said disc members adpacent thereto; said first and second cooperating form lock means engaging one another when said magnetic discs and said armature are compressed to a predetermined point to rigidly connect said first and second rotatable members, and disengaging one another when said discs are separated by a predetermined amount.

References Cited in the file of this patent

UNITED STATES PATENTS 2,584,116     Duyck _____ Feb. 5, 1952